Feb. 9, 1926.

H. S. REINHEIMER 1,572,038

ANTIGLARE SHIELD

Filed March 1, 1924

Inventor
H. S. Reinheimer
By Knight Bros.
Attorneys

Patented Feb. 9, 1926.

1,572,038

UNITED STATES PATENT OFFICE.

HARRY S. REINHEIMER, OF LEHIGHTON, PENNSYLVANIA.

ANTIGLARE SHIELD.

Application filed March 1, 1924. Serial No. 696,223.

*To all whom it may concern:*

Be it known that HARRY S. REINHEIMER, a citizen of the United States, residing at Lehighton, in the county of Carbon and State of Pennsylvania, has invented certain new and useful Improvements in Antiglare Shields, of which the following is a specification.

This invention relates to anti-glare shields for motor vehicles and particularly to a device of this character having means for electrically controlling the same.

The invention therefore consists in the provision of means for shielding the driver from the glare of approaching headlights and the like together with means whereby the shield may be quickly and conveniently brought into operation when needed, this shield normally remaining in an operative position whereby it will not interfere with the line of vision of the driver.

The novel features and details of construction of my improved invention will be made more apparent as this description proceeds, especially when considered in connection with the accompanying drawings, wherein.

Figure 1:
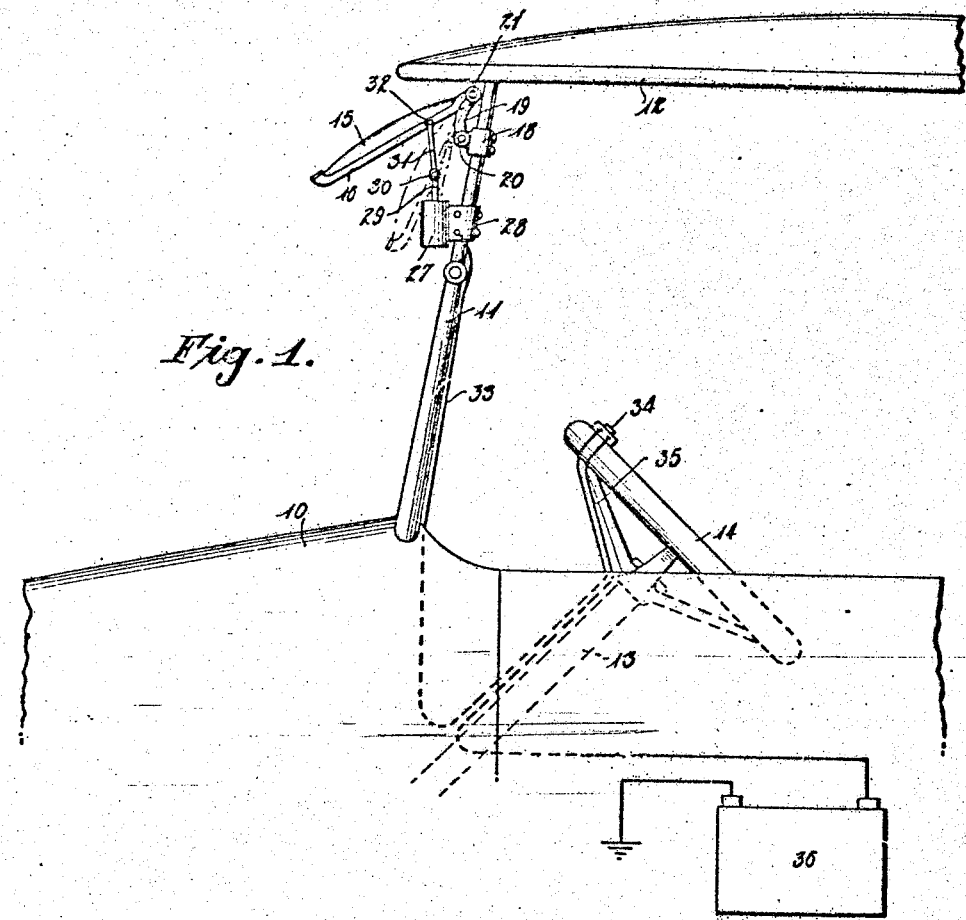
Figure 1 is a fragmentary side elevation of a motor vehicle equipped with my invention.
Figure 2:
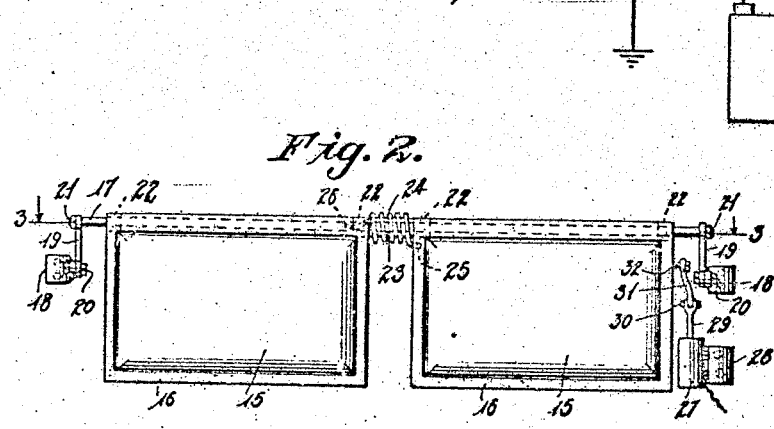
Figure 2 is a front elevation of the shield.
Figure 3:
Figure 3 is a longitudinal section taken substantially on the plane 3—3 in Figure 2.

Referring now particularly to the drawings wherein like references indicate like parts it will be seen that a portion of the body 10 of a motor vehicle is illustrated from which is extended in the customary upward direction a windshield 11 which normally stops adjacent the top 12 of the vehicle. The reference character 13 indicates the customary steering column and 14 the steering wheel.

The shield consists preferably, although not necessarily, of a pair of shield sections 15, the body of which is formed of material such as colored celluloid or the like which provides a translucent screen. Each shield section consists further of a frame 16 which is swingingly mounted on a shaft 17 which extends transversely of the vehicle adjacent the top 12 thereof.

The supporting shaft 17 is attached to the uprights of the wind shield 11 by means of clamps 18, which clamps may consist of arms 19 pivoted to the clamp-members as at 20 and attached to the supporting shaft 17 as at 21. Thumb nuts will preferably be provided at the connections 20 whereby the angularity of the arms 19 with reference to the bracket 18 may be adjusted. By means of this structure the anti-glare shield constituted by the shield sections may be conveniently attached to and properly positioned with reference to the windshield. The shield sections will preferably be pivotally supported on the shaft 17 by means of lugs 22 and the two shield sections will be united so as to move simultaneously by means of a sleeve 23. Arranged preferably around the sleeve 23 is a coil spring 24, one end 25 of which bears against one end of the shield sections while the other end 26 will be fixed to the shaft 17. The tendency of this spring is to maintain the shield sections in their upper or raised position, in which position the driver's view is unobstructed.

For automatically operating the shield there is provided a magnet 27 fixed to one of the uprights of the windshield by means of a bracket 28. To the movable core 29 of this magnet is pivotally connected, as at 30, an operating arm 31 which in turn is pivoted as at 32 to the frame 16 of one of the shield sections. The coil of magnet 27 will preferably be grounded while to the other terminal of this coil is connected a wire 33 which will extend to a switch 34 preferably of the push button type arranged on the steering wheel 14. The other wire 35 extends from this push button to a terminal of the usual storage battery 36. As is customary in automobile circuits of this general character the other terminal of the storage battery 36 is grounded so that when the button 34 is operated the circuit will be completed, thus energizing the coil in the magnet 27 which will cause the core 29 thereof to be drawn into the coil. Consequently, by means of the operating rod 31, the shield sections are swung about the shaft 17 and downwardly into operative position against the action of spring 24. As long as the button 34 is held depressed the shield will be held in its operative position, effectively protecting the eyes of the driver from the glare of the headlights of an approaching vehicle or the like. Obviously, when the button is released the circuit will be broken and the spring 24 will return the shield sections to their upper or inoperative position.

From the foregoing it will be immediately apparent that an anti-glare shield is produced which is simple in construction and operation and which will effectively perform the duties for which it is designed. The shield may be quickly and easily attached to practically all makes of motor vehicles or the like and may be operated separately from the source of current already present.

Obviously, the operating button 34 may be placed at any desired point, its position being a matter of convenience and governed by the choice of the operator. Furthermore, it will be obvious that the material of which the screen is constructed may be chosen to suit the requirements of the manufacturer, it being only important that the same be of a non-transparent material.

While the invention has been described in some detail, it is to be understood that I do not limit the same to the disclosure herein shown and described but reserve the right to make such changes as may come within the purview of the accompanying claims.

Having thus described my invention, what I claim is:

1. The combination with a vehicle, of an anti-glare shield, means for swingingly supporting said shield on said vehicle, yieldable means normally holding said shield in inoperative position, a magnet coil, means for energizing said coil, a movable core within said coil, and connecting means between said core and said shield, whereby on the energization of said coil said shield is swung into operative position.

2. The combination with a vehicle, of an anti-glare shield, means for swingingly supporting said shield on said vehicle, yieldable means normally holding said shield in inoperative position, a magnet coil, means for energizing said coil, a movable core within said coil, and a pivoted connecting link between said core and said shield, whereby on the energization of said coil said shield is swung into operative position.

3. The combination with a vehicle wind shield, of an anti-glare shield, detachable brackets for swingingly supporting said anti-glare shield on said wind shield, yieldable means normally holding said anti-glare shield in inoperative position, a magnet coil, detachable means for supporting said coil on said windshield, means for energizing said coil, a movable core within said coil, and connecting means between said core and said anti-glare shield whereby on the energization of said coil said anti-glare shield is swung into operative position.

4. The combination with a motor vehicle or the like including a windshield, of an anti-glare shield comprising a plurality of panels formed of non-transparent material, a shaft for swingingly supporting said panels, means for normally holding said panels in their raised inoperative position, an electric circuit, a magnet coil in said circuit, a movable core within said coil, and means operatively connecting said core and said panels whereby, said circuit being closed, said panels are moved into their lower operative position.

The foregoing specification signed at Lehighton, Penna., this 18th day of Feb., 1924.

HARRY S. REINHEIMER.

---

Certificate of Correction.

It is hereby certified that in Letters Patent No. 1,572,038, granted February 9, 1926, upon the application of Harry S. Reinheimer, of Lehighton, Pennsylvania, for an improvement in "Antiglare Shields," an error appears in the printed specification requiring correction as follows: Page 2, line 69, claim 4, after the word "panels" insert the clause and comma *adjustable detachable brackets for said shaft,;* and that the said Letters Patent should be read with this correction therein that the same may conform to the record of the case in the Patent Office.

Signed and sealed this 23d day of March, A. D. 1926.

[SEAL.]

M. J. MOORE,
*Acting Commissioner of Patents.*